United States Patent [19]

Neeff et al.

[11] 4,246,401
[45] Jan. 20, 1981

[54] AXOMETHINE PIGMENTS

[75] Inventors: Rutger Neeff; Meinhard Rolf; Walter Müller, all of Leverkusen, Fed. Rep. of Germany

[73] Assignee: Bayer Aktiengesellschaft, Leverkusen, Fed. Rep. of Germany

[21] Appl. No.: 21,676

[22] Filed: Mar. 19, 1979

[30] Foreign Application Priority Data

Mar. 21, 1978 [DE] Fed. Rep. of Germany ....... 2812255

[51] Int. Cl.³ .......................................... C07D 403/02
[52] U.S. Cl. .......................................... 542/415; 8/4; 8/7; 106/288 Q; 542/420
[58] Field of Search ............................... 542/415, 420

[56] References Cited
U.S. PATENT DOCUMENTS 4,122,117  10/1978  Ando et al. ..................... 542/420

Primary Examiner—Arthur P. Demers
Attorney, Agent, or Firm—Sprung, Felfe, Horn, Lynch & Kramer

[57] ABSTRACT

Azomethine pigments of the formula

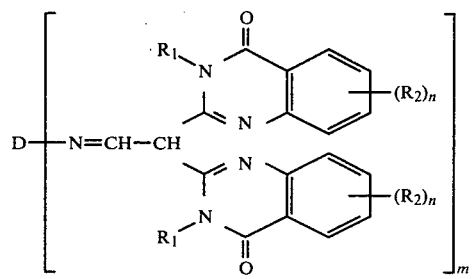

or of the tautomeric formula

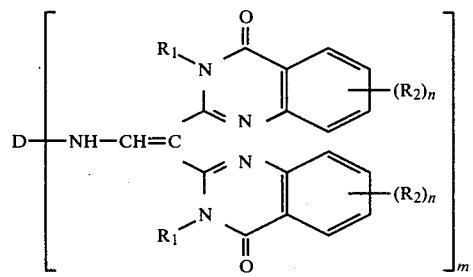

in which
 D denotes the radical of an aromatic or heteroaromatic amine which is free from sulphonic acid groups,
 $R_1$ denotes hydrogen or $C_1$–$C_4$-alkyl, in particular methyl, or both the $R_1$, at the same time, denote CO,
 $R_2$ denotes a substituent,
 m denotes an integer, preferably 1 or 2, and
 n denotes 0, 1, 2, 3 or 4,
a processes for their preparation.

7 Claims, No Drawings

AXOMETHINE PIGMENTS

The invention relates to azomethine pigments of the formula

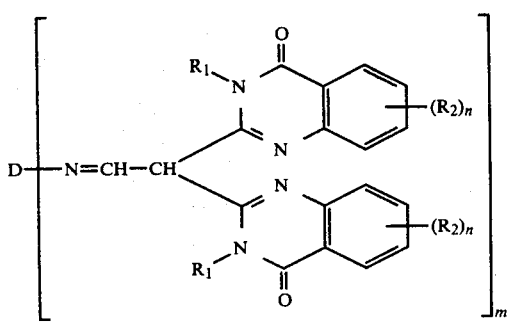

(I)

or of the tautomeric formula

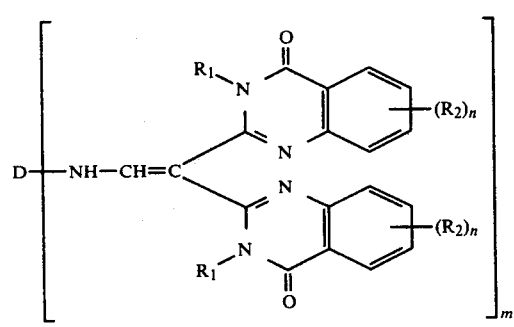

(Ia)

and processes for their preparation.

In the formula I,

D denotes the radical of an aromatic or heteroaromatic amine which is free from sulphonic acid groups, $R_1$ denotes hydrogen or $C_1-C_4$-alkyl, in particular methyl, or both $R_1$, at the same time, denote CO, $R_2$ denotes a substituent, m denotes an integer, preferably 1 or 2, and n denotes 0, 1, 2, 3 or 4.

Examples of suitable substituents $R_2$ are hydrogen, halogen, such as chlorine and bromine, $C_1-C_4$-alkyl, $C_1-C_4$-alkoxy, nitro, trifluoromethyl, cyano, optionally subsituted carboxamide and sulphonamide, acylamino or arylamino.

Possible substituents of the carboxamide and sulphonamide groups are $C_1-C_4$-alkyl and phenyl and benzyl which are optionally substituted by $C_1-C_4$-alkyl, $C_1-C_4$-alkoxy, fluorine, chlorine, bromine or nitro. Acyl groups which may be mentioned are, in particular, $C_1-C_4$-alkylcarbonyl and benzoyl which is optionally substituted in the benzyl nucleus by chlorine, $C_1-C_4$-alkyl, $C_1-C_4$-alkoxy or nitro. Arylamino is, in particular, phenylamino which is optionally substituted by $C_1-C_4$-alkyl, $C_1-C_4$-alkoxy, fluorine, chlorine, bromine or nitro.

Examples of suitable amine components are aniline, 2-methyl-aniline, 2,4-dimethylaniline, 2-nitroaniline. 3-nitroaniline, 4-nitroaniline, 2,4-dinitroaniline, 2-chloro-4-nitroaniline, 4-chloro-2-nitroaniline, 2-chloro-5-nitroaniline, 2-nitro-4-methylaniline, 2-methyl-4-nitroaniline, 2-methyl-5-nitroaniline, 4-methoxy-2-nitroaniline, 2-cyano-4-nitroaniline, 2-bromo-4-nitroaniline, 2-nitro-4-methylsulphonylaniline, 2-nitro-4-ethylsulphonylaniline, 2-chloroaniline, 4-chloroaniline, 2,4-dichloroaniline, 2,5-dichloroaniline, 2,6-dichloroaniline, 3,4-dichloroaniline, 3,5-dichloroaniline, 2,4,5-trichloroaniline, 2,4,6-trichloroaniline, 2-cyano-5-chloroaniline, 2-methyl-4-chloroaniline, 2-methyl-5-chloroaniline, 2,4-dichloro-5-ethylaniline, 2,5-dichloro-4-methylaniline, 2-chloro-4-methylsulphonylaniline, 2-cyano-4-nitroaniline, 2,4-dichloro-5-methoxyaniline, 2-chloro-5-trifluoromethylaniline, 4-chloro-2-trifluoromethylaniline, 3,5-bis-trifluoromethylaniline, 2,4-dimethoxyaniline, 2,5-dimethoxyaniline, 2,5-diethoxyaniline, 2,4-dimethoxy-5-chloroaniline, 2,5-dimethoxy-4-chloroaniline, 2-methoxy-5-methylaniline, 4-methoxy-2-methylaniline, 2-methoxy-5-methyl-4-chloroaniline, 2-methoxy-4-nitroaniline, 4-methoxy-2-nitroaniline, 2-methoxy-5-nitroaniline, 2,5-dimethoxy-4-nitroaniline, 2-methoxy-5-methyl-4-nitroaniline, 2-methoxy-5-chloro-4-nitroaniline, 2-methoxy-5-ethylsulphonylaniline, 2-methoxy-5-phenylsulphonylaniline, 2-methoxy-5-benzylsulphonylaniline, 2-methoxy-4-chloroaniline, 2-ethoxy-4-chloroaniline, 2-methoxy-5-chloroaniline, 2-ethoxy-5-chloroaniline, 2-methoxy-4,5-dichloroaniline, 2-amino-5-chlorodiphenyl ether, 2-amino-4,4'-dichlorodiphenyl ether, 2-amino-4,6-dichlorodiphenyl ether, 4-amino-5-methoxybenzenesulphonic acid 4-nitrophenyl ester, 5-acetylamino-2-nitroaniline, 5-acetylamino-2-chloro-5-methylaniline, 4-acetylamino-2,5-dichloroaniline, 5-acetylamino-2,4-dichloroaniline, 4-benzoylamino-2-methyl-5-methoxyaniline, 5-benzoylamino-2-chloroaniline, 4-benzoylamino-2-chloro-5-methoxyaniline, 2-aminobenzoic acid methyl ester, 2-aminobenzoic acid ethyl ester, 2-aminobenzoic acid isobutyl ester, 4-chloro-2-aminobenzoic acid methyl ester, 5-chloro-2-aminobenzoic acid methyl ester, 6-chloro-2-aminobenzoic acid methyl ester, 3,5-dichloro-2-aminobenzoic acid methyl ester, 4,6-dichloro-2-aminobenzoic acid methyl ester, 5-bromo-2-aminobenzoic acid methyl ester, 4-nitro-2-aminobenzoic acid methyl ester, 5-nitro-2-aminobenzoic acid methyl ester, 4-methyl-2-aminobenzoic acid methyl ester, 5-methyl-2-aminobenzoic acid methyl ester, 6-methyl-2-aminobenzoic acid methyl ester, 4-trifluoromethyl-2-aminobenzoic acid methyl ester, 4-methoxy-2-aminobenzoic acid methyl ester, 4-methoxy-3-aminobenzoic acid phenyl ester, 4-carbamoyl-2-aminobenzoic acid methyl ester, 4-acetylamino-2-aminobenzoic acid methyl ester, 4-benzoylamino-2-aminobenzoic acid methyl ester, 4-(2,5-dichlorobenzoylamino)-2-aminobenzoic acid methyl ester, 4-sulphamoyl-2-aminobenzoic acid methyl ester, 2-aminonaphthalene-3-carboxylic acid methyl ester, 4-methyl-3-aminobenzoic acid methyl ester, 1-aminobenzene-2,5-dicarboxylic acid dimethyl ester, 1-aminobenzene-3,5-dicarboxylic acid dimethyl ester, 2-aminobenzoic acid amide, 4-aminobenzoic acid amide, 4-chloro-3-aminobenzoic acid amide, 4,6-dichloro-3-aminobenzoic acid amide, 3-amino-4-methoxy-benzoic acid amide, 3-amino-4-methoxybenzoic acid phenylamide, 3-amino-4-methylbenzoic acid methylamide, 3-amino-4-methylbenzoic acid (2,4-dimethylphenyl)-amide, 1-aminobenzene-3,5-dicarboxylic acid diamide, 3-amino-4-methylbenzoic acid (2,5-dichlorophenyl)-amide, 3-amino-4-methoxycarbonylbenzoic acid amide, 3-amino-4-methoxycarbonylbenzoic acid phenylamide, 3-amino-4-methoxycarbonylbenzoic acid (2,5-dichlorophenyl)-amide, 3-amino-4-methoxybenzenesulphonic acid methylamide, 3-amino-4-methoxybenzenesulphonic acid diethylamide, 2,5-dimethoxy-4-aminobenzenesulphonic acid methylamide, 2-methyl-5-methoxy-4-aminobenzenesulphonic acid methylamide, 3-amino-4-methylbenzenesulphonic acid phenylamide, 4-amino-2,5-dimethoxybenzenesulphonic acid methylamide, 4amino-2-methyl-5-methoxybenzenesulphonic acid methylamide, 2-chloro-1-aminonaphthalene, 1-amino-2-methoxynaphthalene, 1-amino-4-nitronaphthalene, 2-amino-5-nitronaphthalene, 2-aminothiazole, 2-amino-4-methylthiazole, 2-amino-5-chlorothiazole, 2-amino-5-nitrothiazole, 2-amino-4-methylthiazole-5-carboxylic acid methyl ester, 2-amino-4-methylthiazole-5-carboxylic acid dimethylamide, 2-aminobenzthiazole, 2-amino-6-methylbenzthiazole, 2-amino-5-methoxybenzthiazole, 2-amino-6-methoxybenzthiazole, 2-amino-6-chlorobenzthiazole, 2-amino-6-methylsulphonylbenzthiazole, 6-methyl-2-(4-aminophenyl)-benzthiazole, 5-amino-3-phenyl-1,2,4-thiadiazole, 2-amino-4-methylcarbostyril, 6-amino-4-methyl-2-chlorocarbostyril, 3-amino-4-methoxybenzoxazole, 6-amino-2,4-dihydroxyquinazoline. 1-aminoanthraquinone, 2-aminoanthraquinone, 1-amino-2-chloroanthraquinone, 1-amino-4-chloroanthraquinone, 1-amino-5-chloroanthraquinone, 1-amino-6-chloroanthraquinone, a mixture of 1-amino-6- and -7-chloroanthraquinone, 1-amino-5,8-dichloroanthraquinone, 1-amino-2-bromoanthraquinone, 1-amino-2,4-dibromoanthraquinone, 1-amino-6,7-dichloroanthraquinone, 1-amino-6-fluoroanthraquinone, 1-amino-7-fluoroanthraquinone, 1-amino-6,7-difluoroanthraquinone, 2-amino-1-chloroanthraquinone, 2-amino-3-chloroanthraquinone, 2-amino-3-bromoanthraquinone, 1-amino-4-nitroanthraquinone, 1-amino-5-nitroanthraquinone, 1-amino-2-methylanthraquinone, 1-amino-2-methyl-4-chloroanthraquinone, 1-amino-2-methyl-4-bromoanthraquinone, 1-aminoanthraquinone-2-carboxylic acid, 1-aminoanthraquinone-2-carboxylic acid amide, 1-aminoanthraquinone-2-carboxylic acid methyl ester, 1-amino-4-nitroanthraquinone-2-carboxylic acid, 1-amino-2-acetylanthraquinone, 1-amino-5-benzoylaminoanthraquinone, 1-amino-4-benzoylaminoanthraquinone, 1-amino-4-hydroxyanthraquinone, 1-amino-5-hydroxyanthraquinone, 1-amino-4-methoxyanthraquinone, 1-amino-2-methoxy-4-hydroxyanthraquinone, 1-amino-4-methylaminoanthraquinone, 1-amino-4-cyclohexylaminoanthraquinone, 1-amino-4-anilinoanthraquinone, 1-amino-6-methylmercaptoanthraquinone, 2-phenyl-6-amino-4,5-phthaloylbenzimidazole, 6-chloro-2-amino-3,4-phthaloylacridone, 7-chloro-2-amino-3,4-phthaloylacridone, 5-chloro-8-amino-3,4-phthaloylacridone, 4-aminoanthrapyridone, 5-aminoanthrapyridone, 1,5-diaminoanthraquinone, 1,4-diaminoanthraquinone, 1,8-diaminoanthraquinone, 2,6-diaminoanthraquinone, 1,5-diamino-4-chloroanthraquinone, 1,4-diamino-5-nitroanthraquinone, 1,5-diamino-2,4,6,8-tetrabromoanthraquinone, 1,5-diamino-4,8-dihydroxyanthraquinone, 1,8-diamino-4,5-dihydroxyanthraquinone, 4,4'-diamino-1,1'-dianthrimide, 4,4'-diaminobiphenyl, 4,4'-diamino-3,3'-dimethoxybiphenyl, 4,4'-diamino-3,3'-diethoxybiphenyl, 4,4'-diamino-2,2'-dichlorobiphenyl, 4,4'-diamino-3,3'-dichlorobiphenyl, 4,4'-diamino-2,2'-5,5'-tetrachlorobiphenyl, 4,4'-diamino-2-nitrobiphenyl, 4,4'-diamino-3-methylbiphenyl, 4,4'-diamino-2,2'-dimethylbiphenyl, 4,4'-diamino-3,3'-dimethylbiphenyl, 4,4'-diamino-3,3'-dimethoxy-6,6-dichlorobiphenyl, 1-amino-8-benzoylaminoanthraquinone and 1-amino-2-bromo-4-(4-methylphenylsulphonylamino)-anthraquinone.

Preferred amine components are those of the benzene and anthraquinone series.

Dyestuffs of the formula

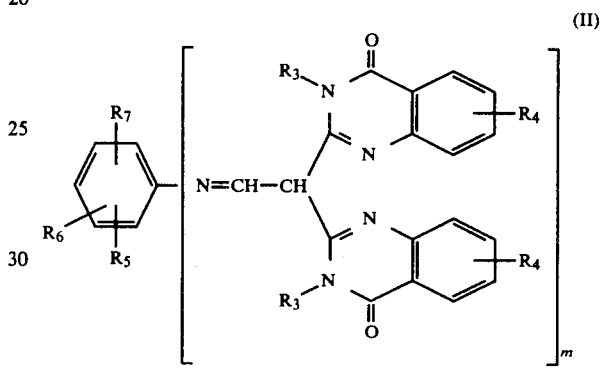

(II)

wherein $R_3$ denotes hydrogen or methyl, $R_4$ denotes hydrogen, $C_1$–$C_4$-alkyl, $C_1$–$C_4$-alkoxy, fluorine, chlorine, bromine, nitro, $C_1$–$C_4$-alkylcarbonylamino or $C_1$–$C_4$-alkylsulphonylamino, $R_5$ denotes hydrogen, halogen, such as fluorine, chlorine and bromine, $C_1$–$C_4$-alkyl, $C_1$–$C_4$-alkoxy, nitro, cyano, $C_1$–$C_4$-alkysulphonyl, trifluoromethyl, $C_1$–$C_4$-alkylcarbonylamino, benzoylamino which is optionally substituted by $C_1$–$C_4$-alkyl, $C_1$–$C_4$-alkoxy, fluorine, chlorine, bromine or nitro, $C_1$–$C_4$-alkoxycarbonyl or carboxamide or sulphonamide which is optionally monosubstituted or disubstituted by $C_1$–$C_4$-alkyl, phenyl or benzyl, it being possible for phenyl and benzyl to be further substituted by $C_1$–$C_4$-alkyl, $C_1$–$C_4$-alkoxy, fluorine, chlorine, bromine and nitro, $R_6$ denotes hydrogen, halogen, such as fluorine, chlorine and bromine, $C_1$–$C_4$-aklyl, cyano, $C_1$–$C_4$-alkoxy, nitro or trifluoromethyl, $R_7$ denotes hydrogen, chlorine, $C_1$–$C_4$-alkyl or $C_1$–$C_4$-alkoxy and m denotes an integer, preferably 1 or 2, are particularly preferred.

Further preferred dyestuffs correspond to the formula

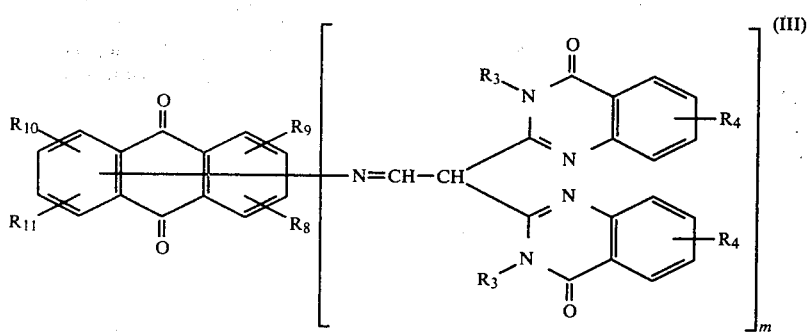

wherein
R$_3$ and R$_4$ have the meaning indicated above,
R$_8$ denotes hydrogen, halogen, such as fluorine, chlorine and bromine, nitro, C$_1$–C$_4$-alkyl, C$_1$–C$_4$-alkoxy, C$_1$–C$_4$-alkylamino, benzylamino, cyclohexylamino, C$_1$–C$_4$-alkylmercapto, phenylmercapto which is optionally substituted by C$_1$–C$_4$-alkyl, C$_1$–C$_4$-alkoxy, fluorine, chlorine, bromine or nitro, C$_1$–C$_4$-alkylcarbonyl, C$_1$–C$_4$-alkoxycarbonyl, phenylamino which is optionally substituted by C$_1$–C$_4$-alkyl, C$_1$–C$_4$-alkoxy, chlorine or nitro, carboxamide which is optionally monosubstituted or disubstituted by C$_1$–C$_4$-alkyl, benzyl or phenyl, it being possible for phenyl to be substituted by C$_1$–C$_4$-alkyl, C$_1$–C$_4$-alkoxy, fluorine, chlorine, bromine or nitro, carboxyl, hydroxyl, C$_1$–C$_4$-alkylcarbonylamino, benzoylamino which is optionally substituted by C$_1$–C$_4$-alkyl, C$_1$–C$_4$-alkoxy, chlorine, bromine or nitro, C$_1$–C$_4$-alkylsulphonylamino or phenylsulphonylamino which is optionally substituted by C$_1$–C$_4$-alkyl, C$_1$–C$_4$-alkoxy, fluorine, chlorine, bromine or nitro,
R$_9$ denotes hydrogen, chlorine or hydroxyl,
R$_{10}$ denotes hydrogen, halogen, such as fluorine, chlorine or bromine, nitro, C$_1$–C$_4$-alkyl, C$_1$–C$_4$-alkoxy, C$_1$–C$_4$-alkylamino, C$_1$–C$_4$-alkylmercapto, phenylmercapto which is optionally substituted by C$_1$–C$_4$-alkyl, C$_1$–C$_4$-alkoxy, fluorine, chlorine, bromine or nitro, C$_1$–C$_4$-alkoxycarbonyl, C$_1$–C$_4$-alkylcarbonyl, benzylamino, cyclohexylamino, phenylamino which is optionally substituted by C$_1$–C$_4$-alkyl, C$_1$–C$_4$-alkoxy, chlorine, bromine or nitro, carboxyl, hydroxyl, carboxamide which is optionally monosubstituted or disubstituted by C$_1$–C$_4$-alkyl, benzyl or phenyl, it being possible for phenyl to be substituted by C$_1$–C$_4$-alkyl, C$_1$–C$_4$-alkoxy, fluorine, chlorine, bromine or nitro, C$_1$–C$_4$-alkyl, carbonylamino, benzoylamino which is optionally substituted by C$_1$–C$_4$-alkyl, C$_1$–C$_4$-alkoxy, chlorine, bromine or nitro, C$_1$–C$_4$-alkylsulphonylamino or phenylsulphonylamino which is optionally substituted by C$_1$–C$_4$-alkyl, C$_1$–C$_4$-alkoxy, fluorine, chlorine, bromine or nitro,
R$_{11}$ denotes hydrogen, halogen, such as fluorine, chlorine and bromine, or hydroxyl and
m denotes an integer, preferably 1 or 2.
Dyestuffs of the formula

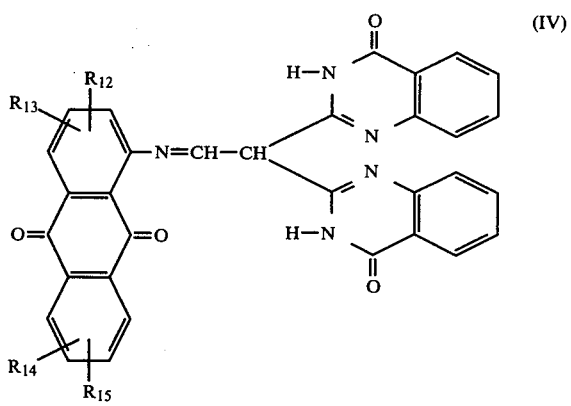

wherein
R$_{12}$, R$_{13}$, R$_{14}$ and R$_{15}$ denote hydrogen, chlorine, bromine, carboxyl, C$_1$–C$_4$-alkoxycarbonyl, carboxamide, C$_1$–C$_4$-alkylcarbonylamino, benzoylamino which is optionally substituted by 1 or 2 nitro groups or 1 to 5 chlorine or bromine atoms, C$_1$–C$_4$-alkylsulphonylamino, phenylsulphonylamino which is optionally substituted by methyl, methoxy or chlorine or a radical of the formula

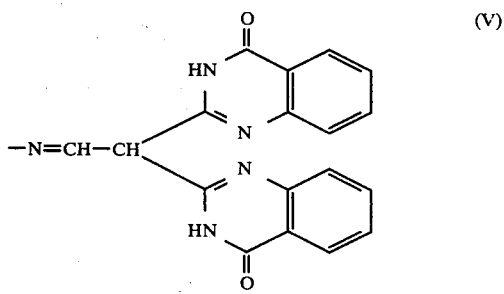

are very particularly preferred.
The preparation of the azomethine pigments (I) from the aromatic amines of the formula

and the methylene-bis-quinazolinones of the formula

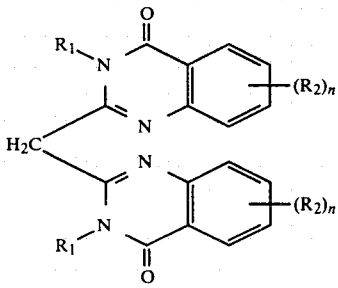

in which
R₁, R₂ and n have the meaning indicated above,
can be carried out by several processes.

(1) The methylene-bis-quinazolinones VII are subjected to a condensation reaction with an orthoformic acid trialkyl ester of the formula

HC(OR)₃ (VIII)

in which
R preferably represents a $C_1$–$C_4$-alkyl group,
in an organic solvent which is inert towards the reactants and at 100°–200° C., and the resulting alkoxy-ethylene-bis-quinazolinones of the formula

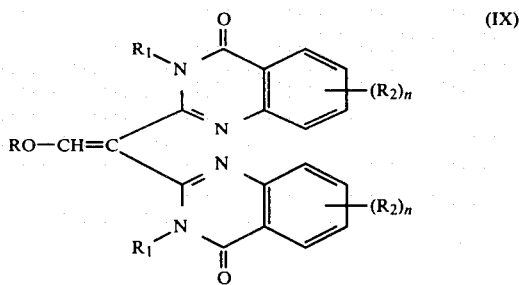

in which
R, R₁, R₂ and n have the meaning indicated above,
are then reacted with an aromatic amine of the formula D-NH₂ (VI) in the same or another organic reaction medium at 100°–200° C., preferably 120°–180° C.

(2) The aromatic amines of the formula

D—NH₂ (VI)

are subjected to a condensation reaction with an orthoformic acid trialkyl ester of the formula VIII given above, in an organic solvent which is inert towards the reactants and at 100°–200° C., preferably 120°–170° C., and the resulting formimino-esters of the formula

D—N=CH—OR (X)

in which
R preferably represents a $C_1$–$C_4$-alkyl group,
are then reacted with a methylene-bis-quinazolinone of the formula VII given above, in the same or another organic reaction medium at 100°–200° C., preferably 120°–180° C.

Suitable organic solvents for processes (1) and (2) are aromatic and hetero-aromatic hydrocarbons, such as toluene, chlorobenzene, pyridine, o-dichlorobenzene, 1,2,4-trichlorobenzene and nitrobenzene, alcohols, such as butanol and diethylene glycol monomethyl ether, ethers, such as ethylene glycol dimethyl ether or ethylene glycol diethyl ether, or dipolar aprotic solvents, such as dimethylformamide, dimethylacetamide, N-methyl-pyrrolidone, tetramethylurea dimethylsulphoxide or tetramethylene sulphone.

(3) In a further process, the aromatic amines of the formula

D—NH₂ (VI)

are converted into the corresponding formamidinium halides of the formula

D—NH—CH=N⊕(R)₂X⊖ (XI)

wherein
R preferably represents a $C_1$–$C_4$-alkyl group and
X represents chlorine or bromine,
with a dialkylformamide and a thionyl halide at 40°–100° C., preferably 40°–80° C., in an organic solvent, and the resulting formamidinium halides (XI) are subjected to a condensation reaction with a methylene-bis-quinazolinone of the formula VII given above, in the same or another organic solvent at 100°–200° C., preferably 120°–180° C., in the presence of an acid-binding agent.

Suitable organic solvents for process (3) are, in particular, aromatic hydrocarbons, such as toluene, chlorobenzene, o-dichlorobenzene, 1,2,4-trichlorobenzene and nitrobenzene, ethers, such as ethylene glycol dimethyl ether or ethylene glycol diethyl ether, or dipolar aprotic solvents, such as dimethylformamide, diethylformamide, N-methylpyrrolidone, dimethylsulphoxide or tetramethylene sulphone.

Lower dialkylformamides, such as dimethylformamide or diethylformamide, are preferably used as the dialkylformamides, but it is also possible to employ cyclic alkylcarboxylic acid amides, such as N-methylpyrrolidone.

Alkali metal hydroxides or carbonates or alkaline earth metal hydroxides or carbonates or alkali metal salts or alkaline earth metal salts of aliphatic carboxylic acids, preferably sodium carbonate, bicarbonate or acetate or potassium carbonate, bicarbonate or acetate, are used as the acid-binding agents.

The compounds of the formula VII are obtained by reacting functional derivatives of malonic acid with anthranilic acid amides of the formula

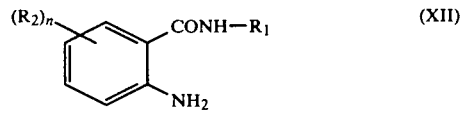

wherein
R₁, R₂ and n have the abovementioned meaning.

The malonic acid derivative and anthranilic acid amide are reacted in a molar ratio of 1:2, the anthranilic acid amide generally being employed in a 0.1 to 10-fold excess. The reaction is reacted at 120° to 220° C., in bulk or in an inert organic solvent, such as o-dichlorobenzene, 1,2,4-trichlorobenzene, ethylene glycol dimethyl ether, ethylene glycol diethyl ether, xylene or nitrobenzene, if appropriate in the presence of catalytic amounts (0.001 to 0.1 mol per mol of malonic acid derivative) of organic bases, such as pyridine, quinoline, triethylamine, N,N-dimethylaniline or diazabicyclooctane.

Possible malonic acid derivatives are, in particular, the malonic acid halides, above all malonic acid dichloride, the malonic acid dialkyl esters, above all the dimethyl and diethyl esters, the malonic acid imino-alkyl esters, in particular the dimethyl and diethyl esters, and malonodinitrile.

The anthranilic acid amides of the formula XII are obtained by reacting the corresponding isatoic acid anhydrides of the formula

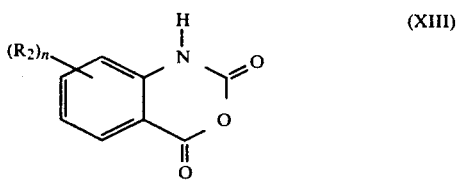
(XIII)

wherein
R$_2$ and n have the abovementioned meaning, with amines of the formula

R$_1$—NH$_2$ (XIV)

wherein
R$_1$ has the abovementioned meaning.

The pigments of the formula I are obtained in a form suitable for pigment use, or can be converted into a suitable form by known after-treatment processes, for example by dissolving or swelling in strong inorganic acids, such as sulphuric acid, and discharging the mixture onto ice. Fine division can also be achieved by grinding, with or without grinding auxiliaries, such as inorganic salts or sand, and if appropriate in the presence of solvents, such as toluene, xylene, dichlorobenzene or N-methylpyrrolidone. The tinctorial strength and transparency of the pigment can be influenced by variation of the after-treatment.

Because of their fastness to light and migration, the pigments of the formula I are suitable for the most diverse pigment applications. The pigments according to the invention can be used for the production of pigmented systems with very good fastness properties, such as mixtures with other substances, formulations, paints, printing pastes, dyed paper and dyed macromolecular substances. By mixing with other substances there may be understood, for example, mixtures with inorganic white pigments, such as titanium dioxide (rutile), or with cement. Examples of formulations are flush pastes with organic liquids or pastes and fine pastes with water, dispersing agents and, if appropriate, preservatives. The term paint means, for example, lacquers which dry physically or by oxidation, stoving lacquers, reactive lacquers, two-component lacquers, emulsion paints for weather-resistant coatings and distempers. By printing pastes there are to be under stood printing pastes for paper printing, textile printing and tinplate printing. The macromolecular substances can be of natural origin, such as rubber, or obtained by chemical modification, such as acetylcellulose, cellulose butyrate or viscose, or synthetically produced, such as polymers, polyaddition products and polycondensates. Examples which may be mentioned are plastic compositions, such as polyvinyl chloride, polyvinyl acetate, polyvinyl propionate, polyolefines, for example polyethylene or polyamides, high molecular weight polyamides, polymers and copolymers of acrylic esters, methacrylic esters, acrylonitrile, acrylamide, butadiene and styrene, and polyurethanes and polycarbonates. The substances pigmented with the products claimed can be in any desired form.

The pigments I according to the invention are furthermore outstandingly fast to water, fast to oil, fast to acid, fast to lime, fast to alkali, fast to solvents, fast to over-lacquering, fast to overspraying, fast to sublimation, stable to heat and stable to vulcanisation, are of very high tinctorial strength and can readily be distributed in plastic compositions.

EXAMPLES

Methylene-bis-quinazolinones of the following formulae are employed in the examples which follow:

TABLE 1

| Formula | R$_1$ | R$_3$ | R$_4$ | R$_5$ | R$_6$ |
|---|---|---|---|---|---|
| XV | H | H | H | H | H |
| XVI | CH$_3$ | H | H | H | H |
| XVII | H | Br | H | H | H |
| XVIII | H | Cl | H | H | H |
| XIX | H | H | Cl | H | H |
| XX | CH$_3$ | H | H | Cl | H |
| XXI | H | H | Cl | H | Cl |
| XXII | H | H | NO$_2$ | H | H |
| XXIII | CH$_3$ | H | H | NO$_2$ | H |
| XXIV | H | H | NHCOCH$_3$ | H | H |
| XXV | H | H | H | NHCOCH$_3$ | H |

EXAMPLE 1

(a) 11 g of 97% pure 1-amino-anthraquinone, 8.5 g of orthoformic acid triethyl ester and 90 g of nitrobenzene are stirred at 140°–145° C. for about 3 hours, the ethanol formed being distilled off over a bridge and the formation of the formimino-ester of the formula

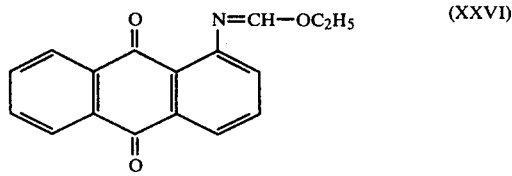
(XXVI)

being followed by thin layer chromatography. When the 1-amino-anthraquinone has disappeared, 15.2 g of the methylene-bis-quinazolinone of the formula (XV) are added and the reaction mixture is heated to 145°–150° C. for a further 2–3 hours. It is then allowed to cool to 120° C. and the pigment, which has crystallised as red needles, is filtered off, washed with hot nitrobenzene and methanol and dried at 100° C. 22.6 g (87% of theory) of the red pigment of the formula

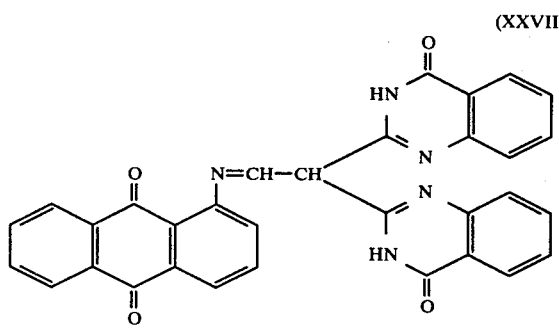

are thus obtained.

C$_{32}$H$_{19}$N$_5$O$_4$ (537): Calculated: C 71.6; H 3.54; N 13.02; O 11.90; Found: C 71.8; H 3.6; N 13.2; O 12.21

The pigment can also have the following tautomeric structures:

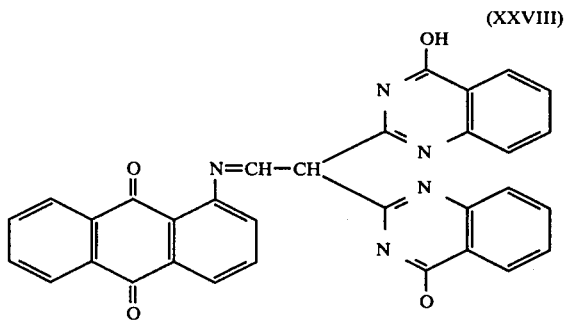

or

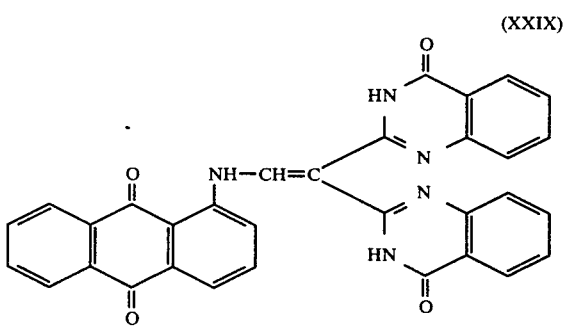

or

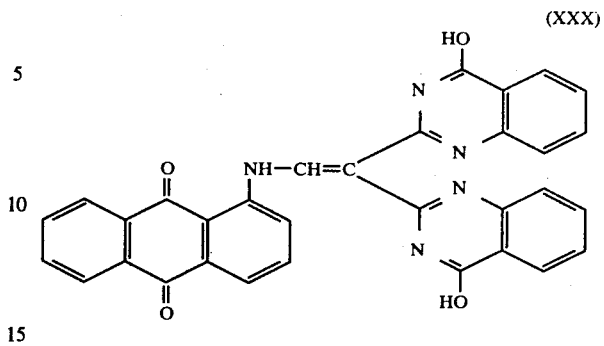

formula (XXX) being given preference, on the basis of investigations by mass spectroscopy and nuclear magnetic resonance spectroscopy.

(b) 7.3 g of thionyl chloride are added to 11 g of 97% pure 1-amino-anthraquinone, 4 g of dimethylformamide and 90 g of nitrobenzene at 50°–60° C. in the course of 1 hour and the mixture is stirred for about a further 1 hour until the formamidinium chloride of the formula

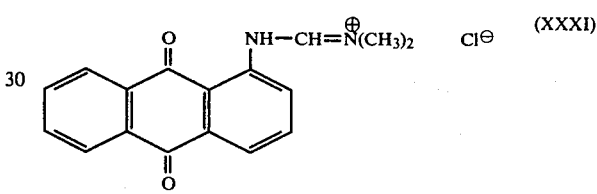

has formed. The mixture is subsequently stirred for a further 1 hour in vacuo in order to remove excess thionyl chloride, 15.2 g of the methylene-bis-quinazolinone of the formula (XV) and 12.5 g of anhydrous sodium acetate are then added successively and the reaction mixture is heated to 150°–160° C. in the course of about 1 hour. It is stirred at 150°–160° C. until formation of the pigment, which has crystallised as red needles, has ended, the pigment is then filtered off at 120° C., washed with hot nitrobenzene and with methanol and water, and, after drying, 21.95 g (84.5% of theory) of the red pigment, identical to Example 1 a, are obtained.

EXAMPLE 2

17 g of 87% pure 1-amino-5-benzoylamino-anthraquinone and 8.5 g of orthoformic acid triethyl ester in 180 g of nitrobenzene are heated to 140°–150° C. for about 2–3 hours, the ethanol formed being distilled off over a short bridge. When the starting material has disappeared, 15.2 g of the methylene-bis-quinazolinone of the formula (XV) are introduced and the mixture is heated to 175°–180° C. for a further 4 hours. After cooling to 120° C., the pigment, which has crystallised as bluish-tinged red needles, is filtered off and washed with hot nitrobenzene and methanol, and, after drying at 100° C., 26.2 parts (92.3% of theory) of the bluish-tinged red pigment of the formula

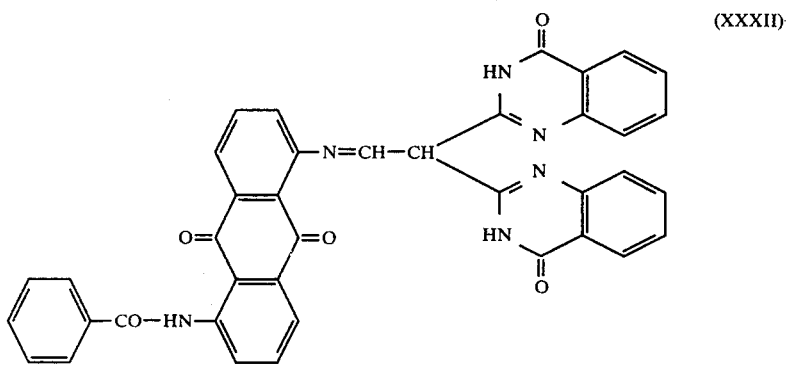

(XXXII)

are obtained.

Calculated: N 12.8; Found: N 12.9

Instead of orthoformic acid triethyl ester, orthoformic acid trimethyl ester can equally successfully be employed in the example. If, instead of 1-amino-5-benzoylaminoanthraquinone, an equivalent amount of 1-amino-4-benzoylamino-anthraquinone is used, a reddish-tinged black pigment is obtained in 96% yield.

EXAMPLE 3

4.7 g of 2-nitro-4-chloro-aniline and 4.4 g of orthoformic acid triethyl ester in 90 g of nitrobenzene are heated to 140°–145° C., the ethanol formed being distilled off, until the starting material has disappeared. 7.6 g of the methylene-bis-quinazolinone of the formula (XV) are now introduced and the mixture is heated further at 145°–150° C. until the formation of the reddish-tinged yellow pigment has ended. The pigment, which has crystallised as reddish-tinged yellow needles, is filtered off at 100° C. and washed with hot nitrobenzene and methanol, and, after drying, 11.22 g (92.3% of theory) of the reddish-tinged yellow pigment of the formula

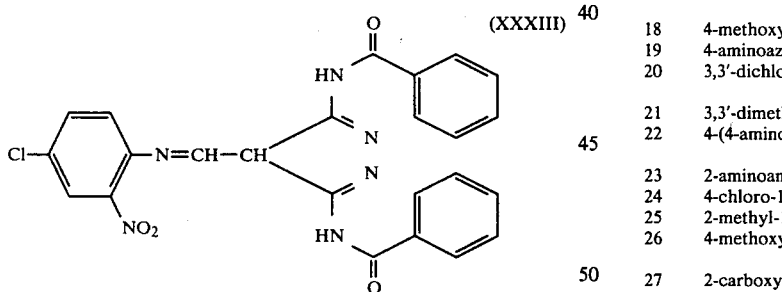

(XXXIII)

are obtained.

Calculated: Cl 7.30; N 17.27; Found: Cl 7.45; N 17.42

Instead of nitrobenzene, the following solvents can equally successfully be used: o-dichlorobenzene, 1,2,4-trichlorobenzene, diethylene glycol monoethyl ether, diethylene glycol dimethyl ether, dimethylformamide, N-methylpyrrolidone, dimethylsulphoxide and tetramethylene sulphone.

Using the amino components D-NH$_2$ listed in the table which follows instead of 2-nitro-4-chloro-aniline, corresponding azomethine pigments with the colour shades indicated are obtained by the process described Example 3.

TABLE 2

| Examples | Amino component D-NH$_2$ | Colour shade |
|---|---|---|
| 4 | aniline | yellow |
| 5 | 2,4-dimethylaniline | yellow |
| 6 | 2-chloroaniline | reddish-tinged yellow |
| 7 | 3-amino-4-chlorobenzamide | reddish-tinged yellow |
| 8 | 3-nitroaniline | yellow |
| 9 | 2-chloro-4-nitroaniline | reddish-tinged yellow |
| 10 | anthranilic acid amide | reddish-tinged yellow |
| 11 | 3-trifluoromethylaniline | yellow |
| 12 | 2-trifluoromethyl-4-chloroaniline | yellow |
| 13 | 2-methoxyaniline | reddish-tinged yellow |
| 14 | 4-methoxyaniline | reddish-tinged yellow |
| 15 | 4-aminobenzoic acid methyl ester | reddish-tinged yellow |
| 16 | 5-amino-isophthalic acid dimethyl ester | yellow |
| 17 | 3,4-dicyanoaniline | reddish-tinged yellow |
| 18 | 4-methoxy-4'-aminodiphenylamine | orange |
| 19 | 4-aminoazobenzene | orange |
| 20 | 3,3'-dichloro-4,4'-diaminobiphenyl | reddish-tinged yellow |
| 21 | 3,3'-dimethoxy-4,4'-diaminobiphenyl | red |
| 22 | 4-(4-aminobenzoylamino)-aniline | reddish-tinged yellow |
| 23 | 2-aminoanthraquinone | orange |
| 24 | 4-chloro-1-aminoanthraquinone | red |
| 25 | 2-methyl-1-aminoanthraquinone | red |
| 26 | 4-methoxy-1-aminoanthraquinone | bluish-tinged red |
| 27 | 2-carboxy-1-aminoanthraquinone | red |
| 28 | 2-aminothiazole | red |
| 29 | 2-aminobenzthiazole | red |

Further pigments with the colour shades indicated in the table which follows are obtained by the process described in Example 3 when the amino components indicated in the second column are used instead of 2-nitro-4-chloroaniline and the methylene-bis-quinazolinones (XVI)–(XXV), taken from Table 1, indicated in the third column are used instead of the methylene-bis-quinazolinone (XV).

TABLE 3

| Example | Amino component D-NH$_2$ | Methylene-bis-quinazolinone from Table 1 | Colour shade |
|---|---|---|---|
| 30 | anthranilic acid amide | (XVI) | reddish-tinged yellow |

TABLE 3-continued

| Example | Amino component D-NH$_2$ | Methylene-bis-quinazolinone from Table 1 | Colour shade |
|---|---|---|---|
| 31 | 4-nitro-2-chloroaniline | (XVII) | reddish-tinged yellow |
| 32 | 3-nitroaniline | (XIX) | yellow |
| 33 | 1-aminoanthraquinone | (XX) | red |
| 34 | 1-amino-5-nitroanthraquinone | (XVIII) | red |
| 35 | 1-amino-4-chloroanthraquinone | (XXIV) | red |
| 36 | 1-amino-5-benzoylamino-anthraquinone | (XXII) | bluish-tinged red |
| 37 | 1-amino-4-methoxy-anthraquinone | (XX) | red |
| 38 | 2-aminobenzthiazole | (XXI) | red |
| 39 | 1-amino-5-(p-chlorobenzoylamino)-anthraquinone | (XXV) | bluish-tinged red |
| 40 | 1-amino-4-hydroxy-anthraquinone | (XXIII) | violet |

EXAMPLE 41

5.9 g of 1,5-diamino-anthraquinone and 11 g of orthoformic acid triethyl ester in 180 g of nitrobenzene are heated to 145°–150° C. for about 3 hours, the ethanol formed being distilled off over a bridge and the disappearance of the starting material being followed by thin layer chromatography. 15.2 g of the methylene-bis-quinazolinone of the formula (XV) are now added and the mixture is heated to 180° C. until the formation of the pigment has ended, which requires about 4 hours. The pigment, which has crystallised as deep red needles, is then filtered off at 120° C. and washed with hot nitrobenzene and methanol, and, after drying at 100° C., 20.5 g (96.3% of theory) of the deep red pigment of the formula

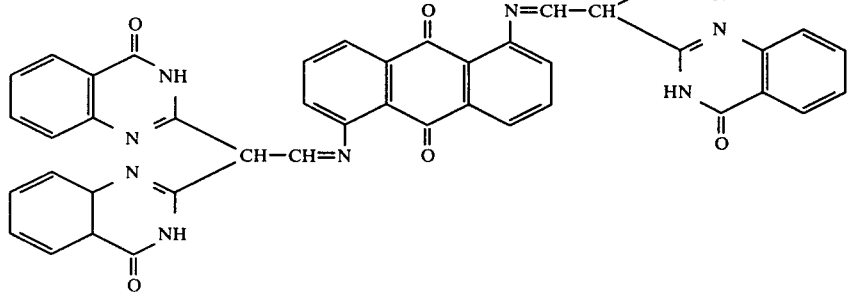

(XXXIV)

are obtained.

Calculated: N 16.17; Found: N 16.0

Using the diamino-anthraquinones listed in the table which follows instead of 1,5-diamino-anthraquinone, corresponding azomethine pigments with the colour shades indicated are obtained by the process described in Example 41.

TABLE 4

| Example | Diamino-anthraquinone | Colour shade |
|---|---|---|
| 42 | 1,4-diamino-anthraquinone | reddish-tinged black |
| 43 | 1,5-dihydroxy-4,8-diamino-anthraquinone | bluish-tinged black |
| 44 | 4,5-dihydroxy-1,8-diamino-anthraquinone | bluish-tinged black |

EXAMPLE 45

(a) 8 g of the finely divided pigment obtained according to Example 1 a are ground with a stoving lacquer consisting of 25 g of a coconut oil alkyd resin (40% of coconut oil), 10 g of a melamine resin, 50 g of toluene and 7 g of glycol monomethyl ether on an automatic Hoover-Muller grinding machine. The mixture is applied to the substrate to be lacquered, the lacquer is hardened by stoving at 130° C. and red lacquerings of very good fastness to over-lacquering and outstanding fastness to light and weathering are obtained.

Pigmented stoving lacquers with the same fastness properties are obtained when 15–25 g of the alkyd resin indicated or of an alkyd resin based on cottonseed oil, dehydrated castor oil, castor oil or synthetic fatty acids are used and, instead of the indicated amount of melamine resin, 10–15 g of the melamine resin mentioned or of a condensation product of formaldehyde with urea or with benzoquanamine are employed.

(b) If, instead of the indicated amount of pigment, 1 to 10 g of a mixture of titanium dioxide (rutile type) and the pigment indicated in Example 45 a in a ratio of 0.5–50:1 are incorporated, by grinding, into the lacquer indicated in Example 45 a, by further processing in the same manner, lacquerings with the same fastness properties and with a red colour shade which is shifted towards white with an increasing content of titanium dioxide are obtained.

EXAMPLE 46

6 g of the finely divided pigment according to Example 1 a are incorporated, by grinding, into 100 g of a nitrocellulose lacquer consisting of 44 g of collodion cotton (low-viscosity, 35%, butanol-moist), 5 g of dibutyl phthalate, 40 g of ethyl acetate, 20 g of toluene, 4 g of n-butanol and 10 g of glycol monomethyl ether. After brushing on and drying, red lacquerings with outstanding fastness to light and over-lacquering are obtained. The same results are obtained when nitrocellulose lacquers with a nitrocellulose content of 10–15 g, plasticiser content of 5–10 g and solvent mixture of 70–85 g are employed, aliphatic esters, such as ethyl acetate and butyl acetate, and aromatic compounds, such as toluene and xylene, and relatively small proportions of aliphatic ethers, such as glycol ether and alcohols, such as butanol, being preferably used. By plasticisers there may be understood, for example: phthalic acid esters, such as dioctyl phthalate and dibutyl phthalate, esters of phosphoric acid, and castor oil, by itself or in combination with oil-modified alkyd resins.

Lacquerings with similar fastness properties are obtained when other spirit lacquers, Zapon lacquers and nitrocellulose lacquers which dry physically are used, or when air-drying oil varnishes, synthetic resin lacquers and nitrocellulose combination lacquers, or oven-drying and air-drying epoxide resin lacquers, optionally in combination with urea resins, melamine resins, alkyd resins or phenolic resins, are used.

EXAMPLE 47

5 g of a finely divided pigment according to Example 1 a are ground in 100 g of an unsaturated polyester resin, which dries without paraffin, in a porcelain ball mill. 10 g of styrene, 59% of a melamine/formaldehyde resin and 1 g of a paste of 40 g of cyclohexanone peroxide and 60% of dibutyl phthalate are stirred thoroughly with the ground mixture, and finally 4 g of a dryer solution (10% strength cobalt naphthenate in white spirit) and 1 g of a silicone oil solution (1% strength in xylene) are admixed. The mixture is applied to primed wood and a high-gloss, water-resistant red lacquering which is fast to weathering and has outstanding fastness to light is obtained.

If amine-curing epoxide resin lacquers containing dipropylenediamine as the amino component are used instead of the reactive lacquer based on an unsaturated polyester resin, red lacquerings of outstanding fastness to weathering and effluorescence are obtained.

EXAMPLE 48

100 g of a 65% strength solution of an aliphatic polyester, with about 8% of free hydroxyl groups, in glycol monoethyl ether-acetate are ground with 5 g of the pigment obtained according to Example 1 a and the mixture is then mixed thoroughly with 44 g of a 67% strength solution of the reaction product of 1 mol of trimethylolpropane and 3 mols of toluylene-diisocyanate. Without impairment of the pot life, after the mixture has been applied and the components have reacted, high-gloss red polyurethane lacquerings of outstanding fastness to effluorescence, light and weathering result.

A pigmentation of similar fastness properties is obtained when other two-component lacquers based on aromatic or aliphatic isocyanates and polyethers or polyesters containing hydroxyl groups are used, and with polyisocyanate lacquers which give polyurea lacquerings which dry in the presence of moisture.

EXAMPLE 49

5 g of a fine paste obtained by kneading 50 g of the pigment obtained according to Example 1 a with 15 g of an aryl polyglycol ether emulsifier and 35 g of water are mixed with 10 g of barite, as a filler, 10 g of titanium dioxide (rutile type), as a white pigment, and 40 g of an aqueous emulsion paint containing about 50% of polyvinyl acetate. The paint is brushed on and, after drying, red paint films of very good fastness to lime and cement and outstanding fastness to weathering and light are obtained.

The fine paste obtained by kneading is equally suitable for pigmenting clear polyvinyl acetate emulsion paints, for emulsion paints which contain copolymers of styrene and maleic acids as binders, and emulsion paints based on polyvinyl propionate, polymethacrylate or butadiene-styrene.

EXAMPLE 50

10 g of the pigment paste mentioned in Example 49 are mixed with a mixture of 5 g of a 20% strength size solution. A red wallpaper paint is obtained, with which coatings of outstanding fastness to light are achieved. It is also possible to use other non-ionic emulsifiers, such as the reaction products of nonylphenyol and ethylene oxide, or ionic wetting agents, such as the sodium salts of alkylarylsulphonic acid, for example of dinaphthylmethanedisulphonic acid, sodium salts of substituted sulpho-fatty acid esters and sodium salts of paraffinsulphonic acids, in combination with alkyl polyglycol ethers, to prepare the pigment paste.

EXAMPLE 51

A mixture of 65 g of polyvinyl chloride, 35 g of diisooctyl phthalate, 2 g of dibutyl-tin mercaptide, 0.5 g of titanium dioxide and 0.5 g of the pigment of Example 1 a is compounded on a mixing mill at 165° C. An intensively red-coloured composition is obtained which can be used for the production of films or shaped articles. The coloration is distinguished by outstanding fastness to light and very good fastness to plasticisers.

EXAMPLE 52

0.2 g of the pigment according to Example 1 a is mixed with 100 g of granular polyethylene, polypropylene or polystyrene. The mixture can either be injection-moulded directly in an injection-moulding machine at 220° to 280° C., or can be processed in an extruder to give coloured rods or on a mixing mill to give coloured hides. If desired, the rods or hides are granulated and the granules are injection-moulded in an injection-moulding machine.

The red moulded articles have very good fastness to light and migration. Synthetic polyamides of caprolactam or adipic acid and hexamethylenediamine or the condensation products of terephthalic acid and ethylene glycol can be coloured in a similar manner at 280°–300° C., if appropriate under a nitrogen atmosphere.

EXAMPLE 53

1 g of the pigment according to Example 1 a, 10 g of titanium dioxide (rutile type) and 100 g of a copolymer, present in the form of a powder, based on acrylonitrile/butadiene/styrene are mixed and the mixture is compounded at 140°–180° C. on a roll mill. A red-coloured hide is obtained and is granulated, and the granules are injection-moulded at 200°–250° C. in an injection-moulding machine. Red moulded articles of very good fastness to light and migration and excellent stability to heat are obtained.

Plastics based on cellulose acetate, cellulose butyrate and a mixture thereof are coloured, with similar fastness properties, in a similar manner, but at temperatures of 180°–220° C. and without the addition of titanium dioxide.

EXAMPLE 54

0.2 g of the pigment according to Example 1 a, in the finely divided form, are mixed with 100 g of a plastic based on polycarbonate at 250°–280° C. in an extruder or a kneading screw and the mixture is processed to granules. Red, transparent granules of outstanding fastness to light and stability to heat are obtained.

EXAMPLE 55

90 g of a slightly branched polypropylene glycol with a molecular weight of 2,500 and a hydroxyl number of 56, 0.25 g of endoethylenepiperazine, 0.3 g of tin-II octoate, 1.0 g of a polyether-siloxane, 3.5 g of water and 12.0 g of a ground mixture of 10 g of the pigment according to Example 1 a in 50 g of the polypropylene glycol indicated are mixed thoroughly with one another, and the mixture is then mixed intimately with 45 g of toluylene -diisocyanate (80% of the 2,4-isomer and 20% of the 2,6-isomer) and poured into a mould. After 6 seconds, the mixture becomes turbid and foaming takes place. After 70 seconds, an intensively red-coloured, soft polyrethane foam has formed, the pigmentation of which exhibits outstanding fastness to light.

EXAMPLE 56

90 g of a slightly branched polyester of adipic acid, diethylene glycol and trimethylolpropane with a molecular weight of 2,000 and a hydroxyl number of 60 are mixed with the following components: 1.2 g of dimethylbenzylamine, 2.5 g of sodium castor oil-sulphate, 2.0 g of an oxyethylated, benzylated oxydiphenyl, 1.75 g of water and 12 g of a paste prepared by grinding 10 g of the pigment according to Example 1 a in 50 g of the polyester indicated above. After the mixing process, 40 g of toluylene-diisocyanate (65% of the 2,4-isomer and 35% of the 2,6-isomer) are stirred in, whilst stirring, and the mixture is poured into a mould and foamed. After 60 seconds, a red-coloured, soft polyurethane foam has formed, the coloration of which is distinguished by very good fastnesses to light.

EXAMPLE 57

Red offset prints of high billiancy and good depth of colour and very good fastness to light and lacquering are obtained with a printing paste prepared by grinding 35 g of the pigment according to Example 1 a and 65 g of linseed oil and adding 1 g of sicoative (Co naphthenate, 50% strength in white spirit). Using this printing paste in letterpress printing, collotype printing, lithographic printing or die stamping leads to red prints of similar fastness properties. If the pigment is used for colouring tinplate printing pastes or low-viscosity gravure printing pastes or printing inks, red prints of similar fastness properties are obtained.

EXAMPLE 58

A printing paste is prepared from 10 g of the fine pigment paste indicated in Example 49, 100 g of 3% strength tragacanth gum, 100 g of an aqueous 50% strength egg albumin solution and 25 g of a non-ionic wetting agent. A textile fibre fabric is printed, and steamed at 100° C., and a red print which is distinguished by outstanding fastness properties, in particular fastnesses to light, is obtained. Instead of the tragacanth gum, it is possible to use, in the printing paste, other binders which can be used for fixing the pigment onto the fibre, for example those based on synthetic resins, British gum or cellulose glycolate.

EXAMPLE 59

A mixture of 100 g of light crepe, 2.6 g of sulphur, 1 g of stearic acid, 1 g of mercaptobenzthiazole, 0.2 g of hexamethylenetetramine, 5 g of zinc oxide, 60 g of chalk and 2 g of titanium dioxide (anatase type) is compounded, on a mixing mill at 50° C., with 2 g of the pigment obtained according to Example 1 a and then vulcanised at 140° C. for 12 minutes. A red-coloured vulcanisation product of very good fastness to light is obtained.

EXAMPLE 60

22.5 l of an aqueous, approximately 9% strength viscose solution are added to 100 g of a 20% strength aqueous paste, in a stirred vessel, of the pigment according to Example 1 a, prepared, for example, by dissolving the colorant in 96% strength sulphuric acid, discharging the solution onto ice and filtering and washing the paste with water until neutral. The coloured composition is stirred for 15 minutes and then degassed and subjected to a spinning and desulphurising process.

Red filaments or films with very good fastness to light are obtained.

EXAMPLE 61

10 kg of a paper pulp containing 4 g of cellulose per 100 g are treated in a hollander for about 2 hours. During this period, at intervals of a quarter of an hour each, 4 g of rosin size, then 30 g of an approximately 15% strength pigment dispersion, obtained by grinding 4.8 g of the pigment obtained according to Example 1 a with 4.8 g of dinaphthalmethanedisulphonic acid and 22 g of water in a ball mill, and then 5 g of aluminium sulphate are added.

After finishing on the paper machine, red-coloured paper of outstanding fastness to light is obtained.

EXAMPLE 62

The red-pigmented paper produced according to Example 61 is impregnated with a 55% strength solution of a urea/formaldehyde resin in n-butanol and baked at 140° C. Bluish-tinged red laminated paper of very good fastness to migration and outstanding fastness to light is obtained.

Laminated paper with the same fastness properties is obtained by laminating paper which has been printed, by the gravure printing process, with a printing paste containing the red fine pigment paste indicated in Example 49 and water-soluble or saponifiable binders.

EXAMPLE 63

20 g of the pigment obtained according to Example 1 a are finely dispersed in 50 g of dimethylformamide in a bead mill, using a dispersing auxiliary consisting of 50 g of a 10% strength solution of polyacrylonitrile in dimethylformamide. The pigment concentrate thus obtained is added to a spinning solution of polyacrylonitrile in a known manner and the solution is homogenised and then spun to filaments by known dry-spinning processes or wet-spinning processes.

Red-coloured filaments, the colorations of which are distinguished by very good fastness to rubbing, washing, migration, heat, light and weathering, are obtained.

We claim:

1. Azomethine pigments of the formula

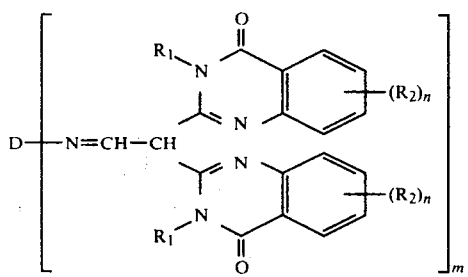

or of the tautomeric formula

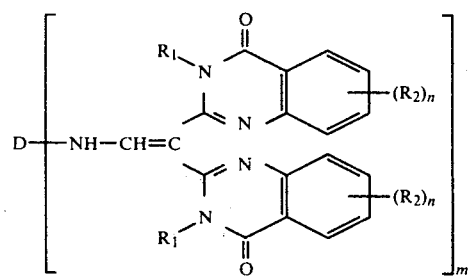

in which

D denotes a substituent of the formula

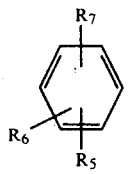

$R_1$ denotes hydrogen or $C_1$-$C_4$-alkyl, or both $R_1$, at the same time, denote CO, $R_2$ denotes hydrogen, halogen, $C_1$-$C_4$ alkyl, $C_1$-$C_4$ alkoxy, nitro, trifluoromethyl, cyano, optionally substituted carboxamide, optionally substituted sulphonamide, acylamino or arylamino, $R_5$ denotes hydrogen, halogen, $C_1$-$C_4$-alkyl, $C_1$-$C_4$-alkoxy, nitro, cyano, $C_1$-$C_4$-alkylsulphonyl, trifluoromethyl, $C_1$-$C_4$-alkylcarbonylamino, benzoylamino which is optionally substituted by $C_1$-$C_4$-alkyl, $C_1$-$C_4$-alkoxy, fluorine, chlorine, bromine or nitro, $C_1$-$C_4$-alkoxycarbonyl or carboxamide or sulphonamide which is optionally monosubstituted or disubstituted by $C_1$-$C_4$-alkyl, phenyl or benzyl, it being possible for phenyl and benzyl to be further substituted by $C_1$-$C_4$-alkyl, $C_1$-$C_4$-alkoxy, fluorine, chlorine, bromine and nitro, $R_6$ denotes hydrogen, halogen, $C_1$-$C_4$-alkyl, cyano, $C_1$-$C_4$-alkoxy, nitro or trifluoromethyl, $R_7$ denotes hydrogen, chlorine, $C_1$-$C_4$-alkyl or $C_1$-$C_4$-alkoxy and m denotes an integer and n denotes 0, 1, 2, 3 or 4.

2. Azomethine pigments of the formula

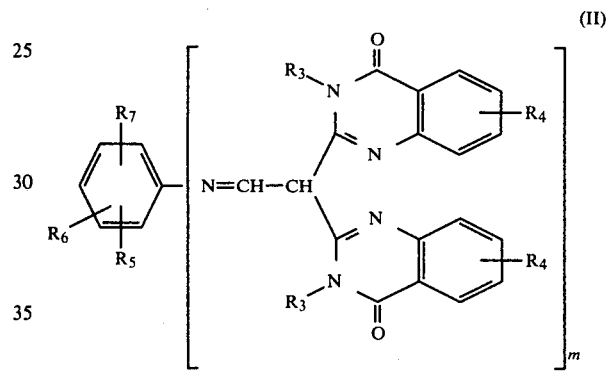

wherein $R_3$ denotes hydrogen or methyl, $R_4$ denotes hydrogen, $C_1$-$C_4$-alkyl, $C_1$-$C_4$-alkoxy, fluorine, chlorine, bromine, nitro, $C_1$-$C_4$-alkylcarbonylamino or $C_1$-$C_4$-alkylsulphonylamino, $R_5$ denotes hydrogen, halogen, such as fluorine, chlorine and bromine, $C_1$-$C_4$-alkyl, $C_1$-$C_4$-alkoxy, nitro, cyano, $C_1$-$C_4$-alkylsulphonyl, trifluoromethyl, $C_1$-$C_4$-alkoxy, fluorine, chlorine, bromine or nitro, substituted benzoylamino, $C_1$-$C_4$-alkoxycarbonyl, carboxamide or sulphonamide which is optionally monosubstituted or disubstituted by $C_1$-$C_4$-alkyl, phenyl or benzyl, it being possible for phenyl and benzyl to be further substituted by $C_1$-$C_4$-alkyl, $C_1$-$C_4$-alkoxy, fluorine, chlorine, bromine and nitro, $R_6$ denotes hydrogen, halogen, $C_1$-$C_4$-alkyl, cyano, $C_1$-$C_4$-alkoxy, nitro or trifluoromethyl, $R_7$ denotes hydrogen, chlorine, $C_1$-$C_4$-alkyl or $C_1$-$C_4$-alkoxy and m denotes an integer, preferably 1 or 2.

3. Azomethine pigments of the formula

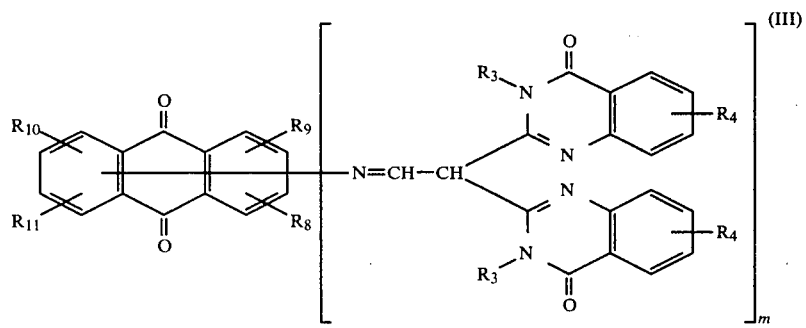

wherein
- $R_3$ and $R_4$ have the meaning indicated above,
- $R_8$ denotes hydrogen, halogen, such as fluorine, chlorine and bromine, nitro, $C_1$-$C_4$-alkyl, $C_1$-$C_4$-alkoxy, $C_1$-$C_4$-alkylamino, benzylamino, cyclohexylamino, $C_1$-$C_4$-alkylmercapto, phenylmercapto which is optionally substituted by $C_1$-$C_4$-alkyl, $C_1$-$C_4$-alkoxy, fluorine, chlorine, bromine or nitro, $C_1$-$C_4$-alkylcarbonyl, $C_1$-$C_4$-alkoxycarbonyl, phenylamino which is optionally substituted by $C_1$-$C_4$-alkyl $C_1$-$C_4$-alkoxy, chlorine or nitro, carboxamide which is optionally monosubstituted or disubstituted by $C_1$-$C_4$-alkyl, benzyl or phenyl, it being possible for phenyl to be substituted by $C_1$-$C_4$-alkyl, $C_1$-$C_4$-alkoxy, fluorine, chlorine, bromine or nitro, carboxyl, hydroxyl, $C_1$-$C_4$-alkylcarbonylamino, benzoylamino which is optionally substituted by $C_1$-$C_4$-alkyl, $C_1$-$C_4$-alkoxy, chlorine, bromine or nitro, $C_1$-$C_4$-alkylsulphonylamino or phenylsulphonylamino which is optionally substituted by $C_1$-$C_4$-alkyl, $C_1$-$C_4$-alkoxy, fluorine, chlorine, bromine or nitro,
- $R_9$ denotes hydrogen, chlorine or hydroxyl,
- $R_{10}$ denotes hydrogen, halogen, such as fluorine, chlorine or bromine, nitro, $C_1$-$C_4$-alkyl, $C_1$-$C_4$-alkoxy, $C_1$-$C_4$-alkylamino, $C_1$-$C_4$-alkylmercapto, phenylmercapto which is optionally substituted by $C_1$-$C_4$-alkyl, $C_1$-$C_4$-alkoxy, fluorine, chlorine, bromine or nitro, $C_1$-$C_4$-alkoxycarbonyl, $C_1$-$C_4$-alkylcarbonyl, benzylamino, cyclohexylamino, phenylamino which is optionally substituted by $C_1$-$C_4$-alkyl, $C_1$-$C_4$-alkoxy, chlorine, bromine or nitro, carboxyl, hydroxyl, carboxamide which is optionally monosubstituted or disubstituted by $C_1$-$C_4$-alkyl, benzyl or phenyl, it being possible for phenyl to be substituted by $C_1$-$C_4$-alkyl, $C_1$-$C_4$-alkoxy, fluorine, chlorine, bromine or nitro, $C_1$-$C_4$-alkyl, carbonylamino, benzoylamino which is optionally substituted by $C_1$-$C_4$-alkyl, $C_1$-$C_4$-alkoxy, chlorine, bromine or nitro, $C_1$-$C_4$-alkylsulphonylamino or phenylsulphonylamino which is optionally substituted by $C_1$-$C_4$-alkyl, $C_1$-$C_4$-alkoxy, flourine, chlorine, bromine or nitro, $R_{11}$ denotes hydrogen, halogen, or hydroxyl and
- m denotes an integer, preferably 1 or 2.

4. Azomethine pigments of the formula

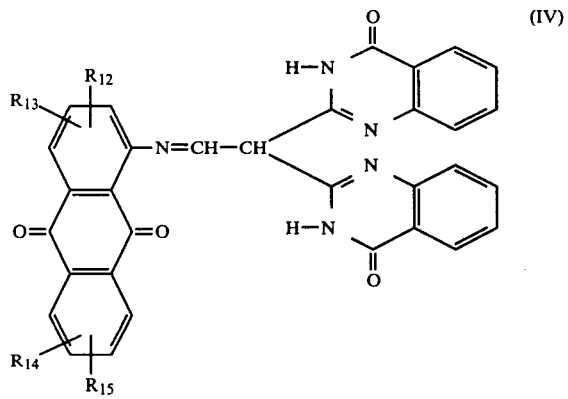

wherein
- $R_{12}$, $R_{13}$, $R_{14}$ and $R_{15}$ denote hydrogen, chlorine, bromine, carboxyl, $C_1$-$C_4$-alkoxycarbonyl, carboxamide, $C_1$-$C_4$-alkylcarbonylamino, benzoylamino which is optionally substituted by 1 or 2 nitro groups or 1 to 5 chlorine or bromine atoms, $C_1$-$C_4$-alkylsulphonylamino, phenylsulphonylamino which is optionally substituted by methyl, methoxy or chlorine or a radical of the formula

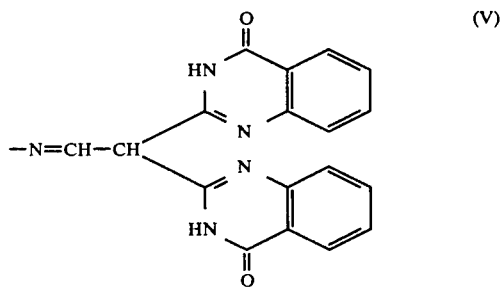

5. Process for the preparation of azomethine pigments, characterised in that aromatic or heteroaromatic amines $$D-NH_2 \qquad (VI)$$

in which
D has the meaning given in claim 1,
are subjected to a condensation reaction with an alkoxyethylene-bis-quinazolinone of the formula

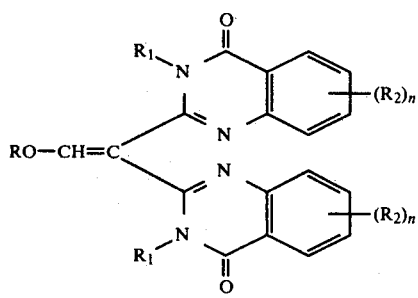

(IX)

in which

R represents a $C_1$–$C_4$-alkyl group and $R_1$, $R_2$ and n have the meaning indicated in claim 1, in an organic solvent at 100°–220° C.

6. Process for the preparation of azomethine pigments, characterised in that formimino-esters of aromatic or hetero-aromatic amines, of the formula $$D-N=CH-OR \qquad (X)$$

in which

D has the meaning given in claim 1, and in which

R represents a $C_1$–$C_4$-alkyl group, are subjected to a condensation reaction with methylene-bis-quinazolinones of the formula

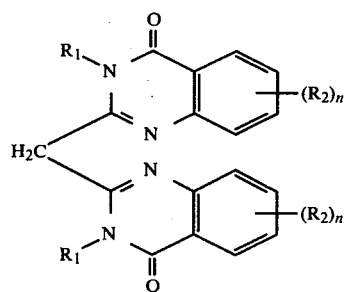

(VII)

in which $R_1$, $R_2$ and n have the meaning indicated in claim 1, in an organic solvent at 100°–220° C.

7. Process for the preparation of azomethine pigments, characterised in that formamidines of aromatic or heteroaromatic amines, of the formula $$D-N=CH-N(R)_2 \qquad (XXXV)$$

in which

D has the meaning given in claim 1, and in which

R represents a $C_1$–$C_4$-alkyl group, are subjected to a condensation reaction with methylene-bisquinazolinones of the formula (VII) in an organic solvent at 100°–220° C.

* * * * *